United States Patent [19]
Sokolski et al.

[11] 3,800,439
[45] Apr. 2, 1974

[54] TEST SCORING APPARATUS

[75] Inventors: Michael Sokolski, Newport Beach, Calif.; Thomas J. Poole, Norwood, Mass.

[73] Assignee: Scan-Tron Corporation, Los Angeles, Calif.

[22] Filed: May 4, 1972

[21] Appl. No.: 250,313

[52] U.S. Cl. ............................................. 35/48 B
[51] Int. Cl. ............................................. G09b 7/10
[58] Field of Search .............. 35/48 B, 9 R; 250/219

[56] References Cited
UNITED STATES PATENTS

| | | | |
|---|---|---|---|
| 3,284,929 | 11/1966 | Azure, Jr. | 35/48 B |
| 3,643,348 | 2/1972 | Azure, Jr. | 35/48 B |
| 3,518,440 | 6/1970 | Hanson et al. | 250/219 D |
| 3,050,248 | 8/1962 | Lindquist | 35/48 B |
| 3,487,561 | 1/1970 | Azure, Jr. et al. | 35/48 B |

Primary Examiner—Harland S. Skogquist
Assistant Examiner—J. H. Wolff
Attorney, Agent, or Firm—Flam & Flam, Howard A. Silber

[57] ABSTRACT

Apparatus is disclosed for scoring a test sheet having a control mark column containing (a) a start of test mark, (b) a plurality of answer control marks, and (c) an end of page mark and having answer receiving spaces associated with the answer control marks in either a "vertical" or "horizontal" format. The apparatus includes a control column sensor and circuitry distinguishing the (a), (b), and (c) control marks. Detection of a start of test mark enables mode selection circuitry to condition the apparatus in accordance with mode indicating marks on the sheet. For example detection of a "master" mark conditions the apparatus to enter answers from a master sheet into a correct answer memory. The absence of a master mark places the apparatus in the scoring mode.

As each answer control mark is detected, answers from the answer spaces row aligned with that mark are entered into a storage register, then compared serially with data from the correct answer memory. Detection of an incorrect answer to a valid question causes an error mark to be printed on the test sheet; a correct answer increments a score counter. Detection of the end of page mark causes score printout. Provision is made for calculating the average score of many test sheets, and for rescoring individual tests with the same or a different set of stored correct answers.

25 Claims, 13 Drawing Figures

TEST SCORING APPARATUS

BACKGROUND OF THE INVENTION

1. Field of the Invention

The present invention relates to an apparatus for scoring multiple choice tests, and particularly to such an apparatus using test sheets having control and mode selection marks for conditioning the scoring operation.

2. Description of the Prior Art

Automatic test scoring devices represent a time saving aid to the overburdened educator. The use of such apparatus, in conjunction with preprinted multiple choice answer sheets, enables rapid scoring of tests, and permits tests to be given with greater frequency than might otherwise be considered if the teacher had to grade the papers manually.

In the past, certain disadvantages have been indigenous to automatic test scoring equipment. For example, the test format usually was fixed. Each question could have only a specific number of possible answers, and the test had to contain a certain number of questions. Greater flexibility is desirable. Therefore, one object of the present invention is to permit the use of test sheets having either the same or a different number of answer choices per question, and to enable scoring of tests having fewer or more questions than accommodated on a particular preprinted answer sheet.

Other prior art problems had to do with the storage of correct answers. In some systems a card containing the correct answers was read in unison with the paper being scored. This complicated operation, since two sheets or cards had to be fed into the machine simultaneously. Another system employed a magnetic drum to store the correct answers. While eliminating the repetitive scanning of an answer card, a drum memory adds substantially to cost and complexity. Another object of the present invention is to provide a test scoring apparatus using an addressable, random access memory for storage of correct answers entered once from a master sheet.

A related problem is that of preventing inadvertent storage of wrong answers. Some prior art devices must be switched manually from the data entry to the test scoring mode. Failure to set the mode select switch properly often resulted in incorrect answer storage. Thus a further object of the invention is to provide means for preventing inadvertent storage of other than the correct answers provided by a master sheet, including provision for automatically switching to the scoring mode when a test sheet is present.

Other features are desirable. These include simplicity of operation, automatic error marking and score printing, computation of the average score for a number of tests, and provision for rescoring of tests.

SUMMARY OF THE INVENTION

These and other objects are achieved by providing a test scoring apparatus using a test sheet containing a start of test control mark, a plurality of answer control marks, an end page mark and other mode selection indicia. Appropriate sensors cooperate with control mark discrimination and mode detection circuitry automatically to condition operation of the scorer in response to these marks and indicia.

The test sheet may use either a horizontal format in which a fixed number of answer receiving spaces are row aligned with each answer control mark, or a vertical format in which a single answer receiving space is aligned with each answer control mark. In the vertical format the number of answer choices per question is not fixed. The presence or absence of a format mode selection mark automatically conditions the scorer for "vertical" or "horizontal" operation.

Correct answers are stored in an addressable memory from a master sheet identified by a "master" mark. Memory read-in is conditioned only if both the master mark is detected and a "program" switch has been closed. If the program switch is not closed, data entry is inhibited even though a master sheet is present. When a test sheet is read by the apparatus, the absence of a "master" mark automatically conditions operation in the scoring mode, further preventing the inadvertent storage of wrong answers.

Considerable flexibility is permitted with respect to how many questions are on a test. For example, the test may have fewer questions than provided for on a preprinted test sheet. If no answer is stored in the correct answer memory for a particular question, that question is ignored when the test sheet is scored. Moreover, the present invention permits automatic scoring of multiple page tests, so that the number of questions may be greater than that accommodated by a single test sheet. The correct answers for each page are stored in different memory sections. The apparatus is conditioned in response to a page indicating mark on each test sheet to access the appropriate memory section.

Provisions are made for marking each incorrect answer on the test sheet, for printing each test score, and for calculating the average score for a number of tests. In a rescore mode the error marks and score printout are offset; in this mode a test can be scored a second time, perhaps with different stored correct answers. This permits a teacher to rescore a set of tests and ignore a question found to be confusing. Other features will become apparent from the following detailed description of the invention.

BRIEF DESCRIPTION OF THE DRAWINGS

A detailed description of the invention will be made with reference to the accompanying drawings wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense but is made merely for the purpose of illustrating the general principles of the invention since the scope of the invention is best defined by the appended claims.

Figure 1:
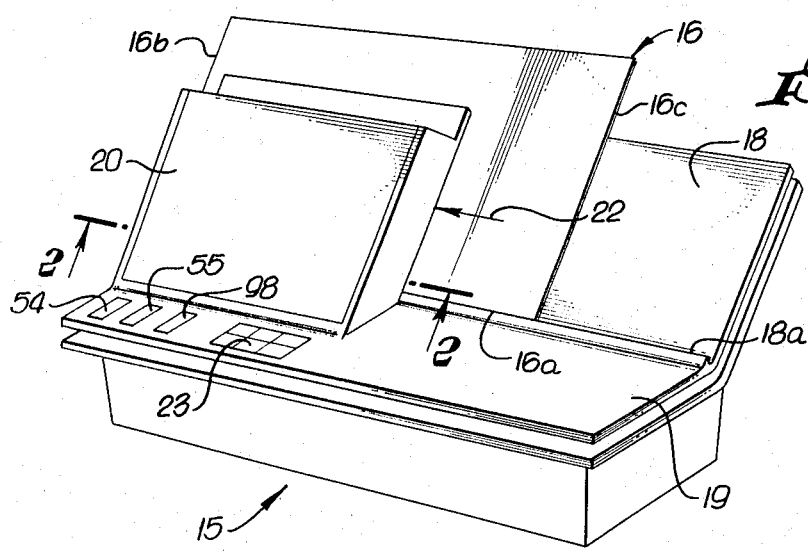
FIG. 1 is a perspective view of a test scoring apparatus in accordance with the present invention.
Figure 2:
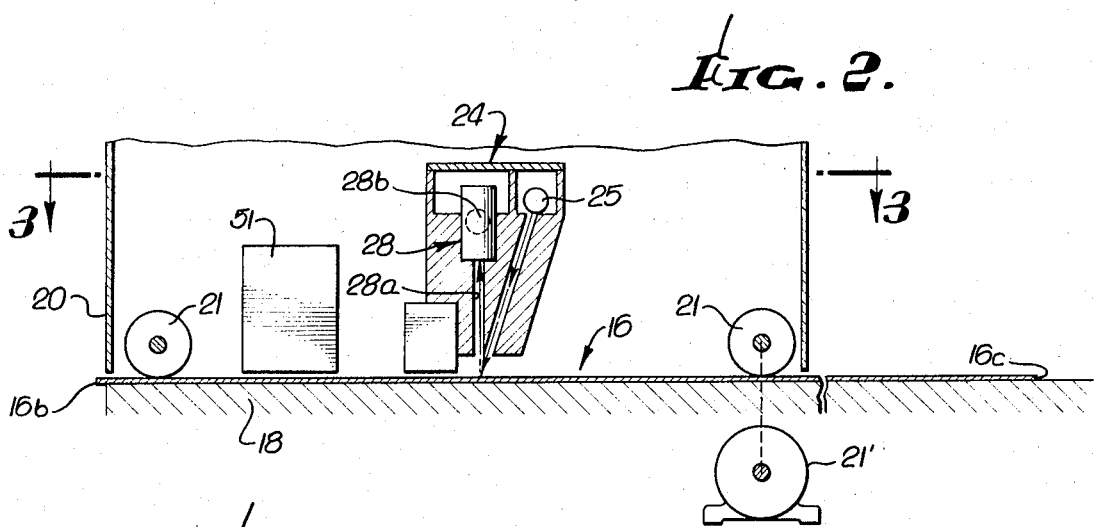
FIG. 2 is a diagrammatic view of the drive, sensing, error marking and score printing mechanisms of the present invention, all as seen along the line 2—2 of FIG. 1.
Figure 5A:
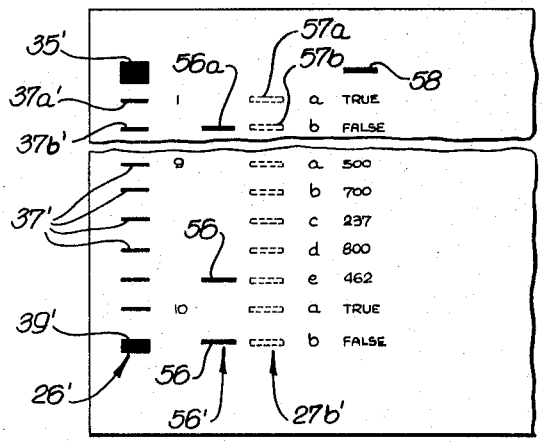
FIGS. 5A and 5B respectively show an unanswered test sheet and an incorrectly answered, scored test sheet, both having a vertical format.

Referring now to the drawings, the inventive test scoring apparatus 15 (FIG. 1) is designed to score a test sheet 16 having a horizontal format (FIG. 3) or a test sheet 17 (FIG. 5A) having a vertical format. As shown in FIG. 1, the test sheet 16 is placed face up on a vertically inclined platen 18 provided on the apparatus housing 19. A longitudinal edge 16a of the test sheet 16 rests on a ledge 18a at the bottom of the platen 18. The test sheet leading edge 16b is inserted behind a reader housing 20 containing a pair of drive wheels 21, rotated by a motor 21', which transport the test sheet 16 in the direction of the arrow 22. As the test sheet 16 is driven beneath the housing 20, each incorrect answer is detected and marked, and the total number of correct answers appears on a display 23 and is printed on the sheet 16.

To accomplish this the test sheet 16 is transported past a read station 24 containing a light source 25 which illuminates both the control mark column 26 and the answer receiving spaces 27 of the test sheet 16. The read station 24 also includes a control channel sensor 28 which detects control marks in the column 26, and a plurality of data channel sensors 29a through 29e which detect answers in the spaces 27.

Figure 6:
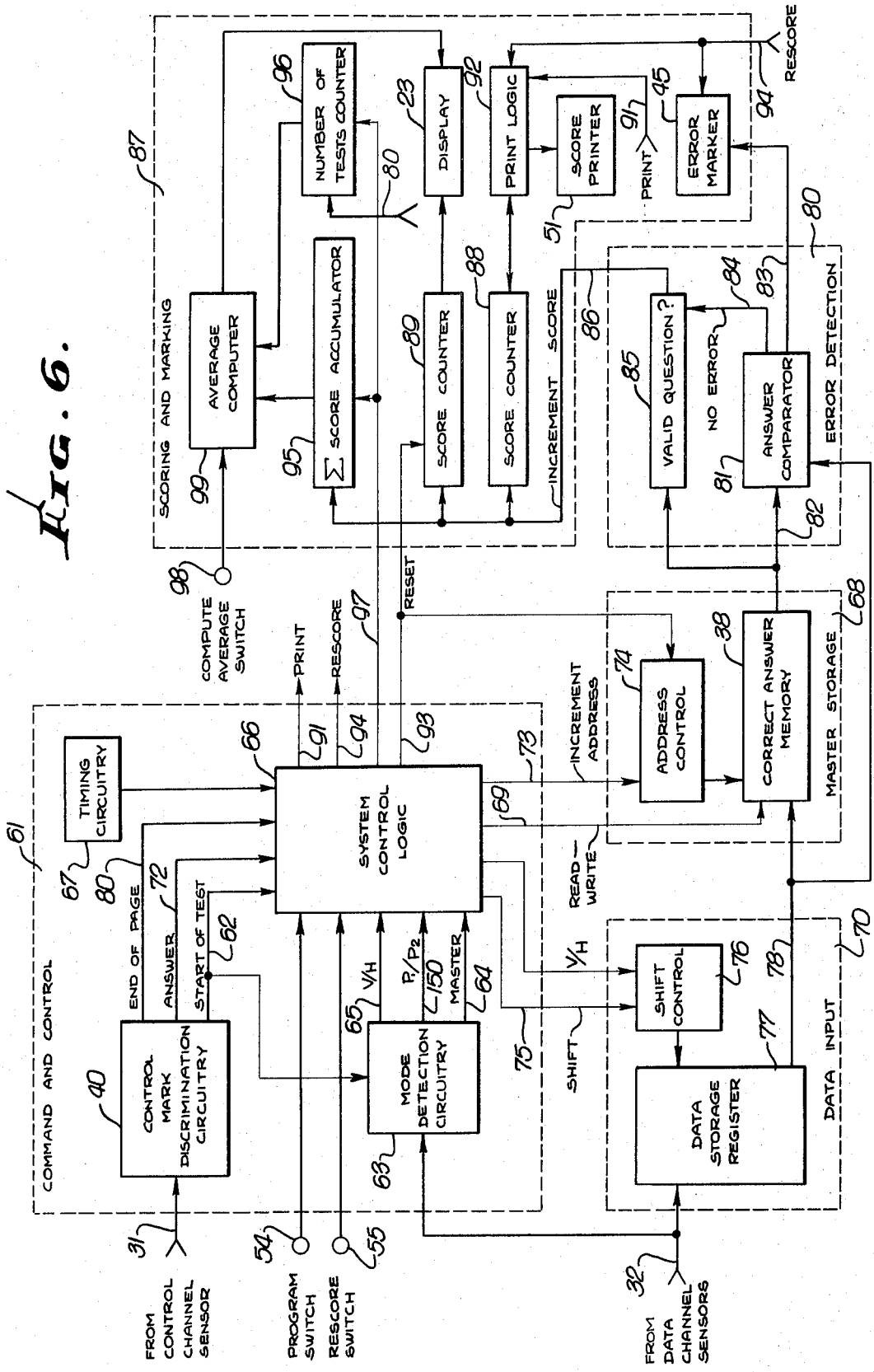
FIG. 6 is an electrical block diagram of circuitry useful in the apparatus of FIG. 1.

The control channel sensor 28 may comprise a light guide 28a, a photosensor 28b and an associated amplifier (now shown) which provide an output signal on a line 31 (FIG. 6) when a control mark is sensed by a reduction in the light level reflected from the sheet 16. Similarly, the data channel sensors 29a – 29e each may comprise a light guide, a photosensor and an associated amplifier providing respective, parallel outputs via a conduit 32 (FIG. 6). The data channel sensors 29a – 29e are row aligned with the control channel sensor 28.

The control mark column 26 (FIG. 3) is parallel to the longitudinal sheet edge 16a, and is headed by a start of test mark 35 detection of which automatically initiates scoring of the sheet 16. Following the start of test mark 35 in the column 26 are a plurality of answer control marks 37 each row aligned with one or more of the answer spaces 27. As described below, detection of an answer mark 37 enables appropriate circuitry to compare an answer entered in a space 27 aligned with that mark 37 with corresponding correct answer data stored in a memory 38 (FIG. 6). The last control mark in the column 26 is an end of page mark 39 which enables score printout. The end of page mark 39 also may function as an answer control mark.

The various control marks in the column 26 differ in length parallel to the sheet edge 16a. The start of test mark 36 is of greatest length, an answer control mark 37 is of shortest length, and the end of page mark 39 is of intermediate length. Appropriate control mark discrimination circuitry 40 (FIGS. 6 and 7) determines which type of control mark is present beneath the sensor 28.

Figure 3:
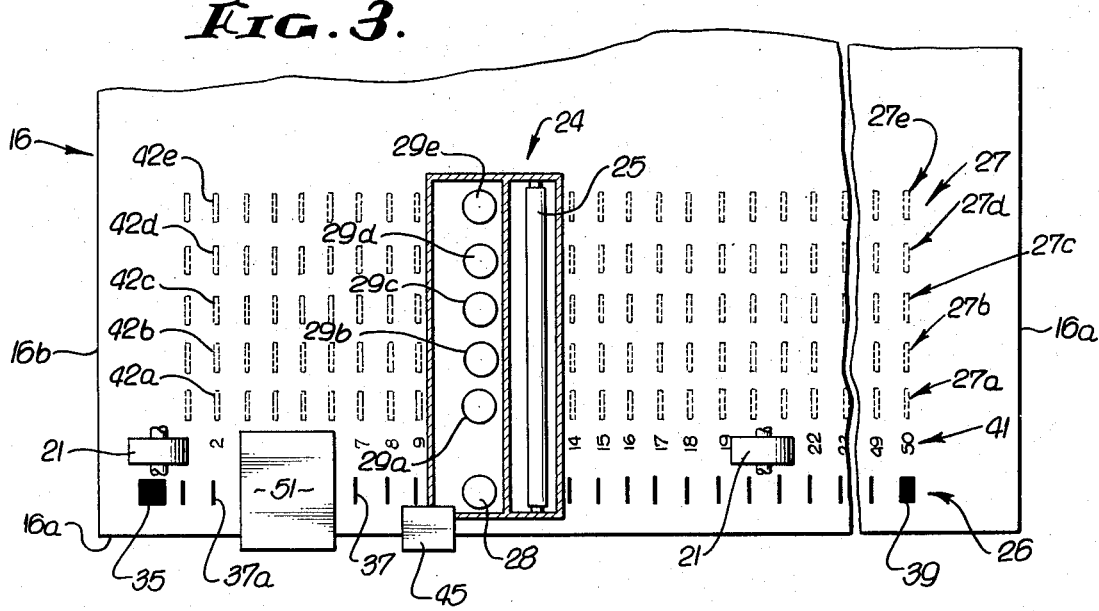
FIG. 3 shows the same mechanisms as FIG. 2, as viewed along the line 3—3 thereof, and shown scoring together with a test sheet having a horizontal format.

In the horizontal data format of FIG. 3, a single answer control mark 37 is associated with each test question. The questions themselves may be identified by numbers printed in a column 41. For each question, five answer receiving spaces 27 are row aligned with the corresponding answer control mark 37. Thus for question 2, the answer receiving spaces 42a – 42e are aligned with the answer control mark 37a. To answer question 2, an opaque mark is entered in that one of the answer spaces 42a – 42e corresponding to the selected answer. Such answer indicia are detected by the control channel sensors 29a – 29e which are positioned over the respective answer columns 27a – 27e.

Figure 4A:
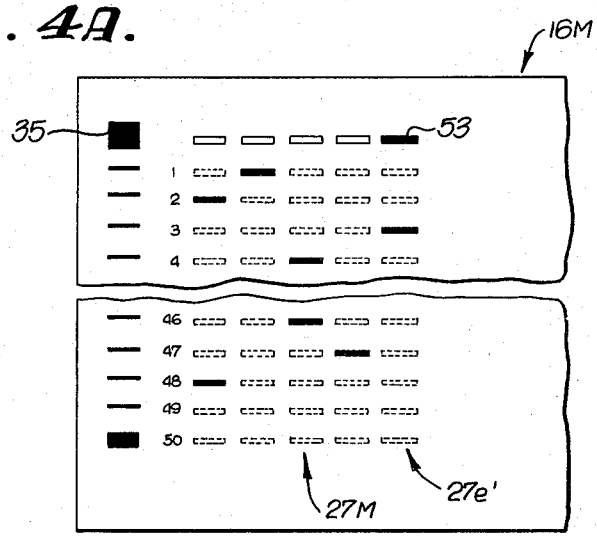
FIGS. 4A, 4B and 4C show respectively a master sheet for entering correct answers into the apparatus of FIG. 1, an incorrectly answered test sheet, and a test sheet which has been rescored, all having the horizontal format.
Figure 4B:
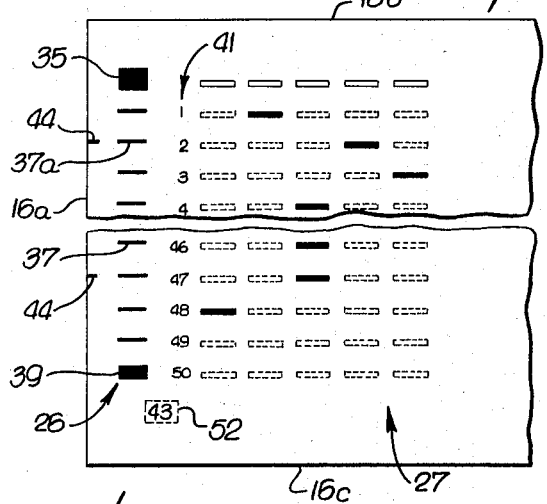

If an incorrect answer is detected, an error mark 44 is printed in the margin of the test sheet 16 by a marker 45. Two such error marks 44 are shown in FIG. 4B adjacent the answer control marks 37 for the incorrectly answered questions 2 and 47. Subsequent to detection of the end of page mark 39, the total number of correct answers is printed on the sheet 16 by a score printer 51. Thus in FIG. 4B the score ("43" correct answers) has been printed in a region 52 near the trailing edge 16c of the test sheet 16.

Correct answers are entered into the memory 38 from a master sheet 16M (FIG. 4A) configured like the test sheet 16. The sheet 16M is identified as a master by a mark 53 row aligned with the start of test control mark 35 and column aligned with the answer spaces 27e'. The correct answers are marked in the spaces 27M. To load the correct answer memory 38, the master sheet 16M is placed on the platen 18 (FIG. 1) and a "program" switch 54 momentarily is depressed. As the master sheet 16M is driven beneath the housing 20, the correct answers are written into the memory 38. To verify correct data entry, the master sheet again is transported past the read station 24 without closing the program switch 54. If the correct answers have been entered properly, the display 23 will show a score equal to the total number of questions on the test.

A test sheet 16 can be scored by the apparatus 15 immediately after correct answer entry from the master sheet 16M. The test sheet 16 has no mark in the "master" position 53. The absence of such a master mark 53 causes the apparatus 19 to function in the score mode, without manual switching to such mode. The possibility of inadvertently entering wrong answers in the memory 38 is reduced.

Figure 4C:
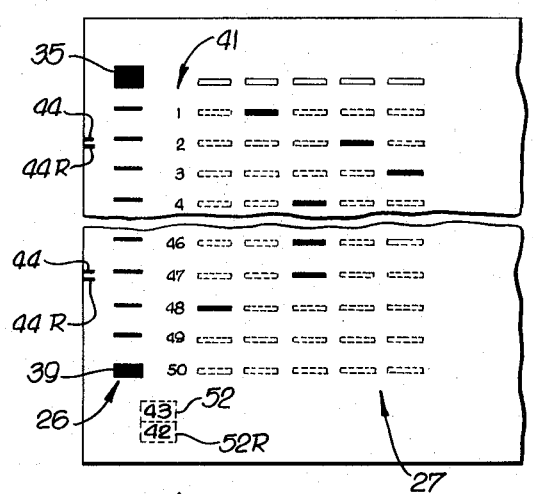

Provision for rescoring is included in the apparatus 19. When a rescore switch 55 is closed, each error mark 44R (FIG. 4C) is printed at a position offset from the error mark 44, and the new score is printed in a region 52R offset from the score region 52. The rescore provision may be used when it is decided to delete a question from a test. For example, the correct answers on the master sheet 16M may be used initially to score the test sheet 16 of FIG. 4B. A new master sheet (not shown) containing no answer to question 48 then may be used to load the memory 38. When the same test sheet 16 is rescored, as shown in FIG. 4C, the answer to question 48 will be ignored, as reflected by the new score printed in the rescore region 52R.

In the vertical format, the test sheet 17 (FIG. 5A) has a control mark column 26' like that of the sheet 16. However several answer control marks 37' are associated with each test question. The answer receiving spaces all are situated in a single column 27b' detected by the data channel sensor 29b. End of question marks 56 are provided in a column 56' aligned with the sensor 29a to indicate the end of each question. Thus in FIG. 5A, the question 1 includes two answer receiving spaces 57a, 57b row aligned with the respective answer control marks 37a' and 37b'. An end of question mark 56a aligned with the answer control mark 37b' indicates that the answer space 57b is the last one associated with question 1.

Figure 5B:
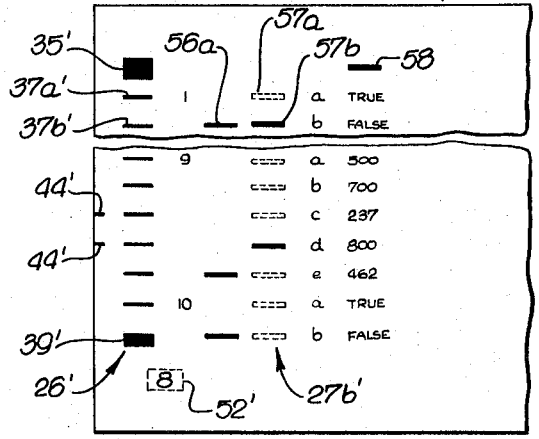

The apparatus 15 scores the test sheet 17 in a manner similar to that for the horizontal format. The circuitry of FIG. 6 is conditioned to the vertical format by detection of a "vertical" mark 58 row aligned with the start of test mark 35' and column aligned for detection by the data channel sensor 29d. Absence of a "vertical" mark 58, as on the test sheet 16, causes the apparatus 19 to score in the horizontal mode. In the vertical mode, the error marker 45 places a mark 44' (FIG. 5B) adjacent each incorrect answer. The score is printed by the printer 51 in the region 52' subsequent to detection of the end of page mark 39'.

Illustrative circuitry for the scoring apparatus 15 is shown in FIG. 6. A command and control section 61 directs system operation in response to detection of the control and mode marks discussed above. The command section 61 includes the control mark discrimination circuitry 40 which provides a "start of test" signal on a line 62 upon detection of the control mark 35 or 35'. This signal enables the mode detection circuitry 63 to ascertain the answer format and whether a master or test sheet is being sensed. Detection of a "master" mark 53 causes the detection circuitry 63 to provide on a line 64 a signal indicating that a master sheet is present. Vertical or horizontal (V/H) format is indicated by signal on a line 65 in response to detection or absence of a "vertical" mark 58.

System control logic 66, included in the command section 61, cooperates with timing circuitry 67 to enter correct answers into a master storage unit 68 when the "master" signal is present on the line 64 and the program switch 54 is closed. In such instance, the logic 66 supplies a "write" signal via a line 69 to enable data entry to the correct answer memory 38. The logic 66 also conditions a data input unit 70 to receive vertical or horizontal (V/H) data via the conduit 32 from the channel sensors 29a – 29e.

As the master sheet moves past the read station 24, each answer control mark 37 or 37' causes the discrimination circuitry 40 to provide an "answer" signal on a line 72. In response to this signal, the logic 66 provides an "increment address" signal via a line 73 to an address control 74 which directs data entry to the appropriate storage locations of the memory 38. The logic 66 also provides "shift" signals via a line 75 to shift control circuitry 76 associated with a data storage register 77. The register 77, which may comprise a conventional shift register, receives the parallel outputs from the data channel sensors 29a – 29e. The shift control circuitry 76 causes this data to be shifted out of the register 77 serially and supplied via a line 78 to the correct answer memory 38. In the horizontal format, data from the several answer receiving spaces associated with one answer control mark 37 are supplied serially via the line 78 before detection of the answer control mark 37 for the next question. In the vertical format, one answer bit is supplied via the line 78 each time an answer control mark 37' is detected.

When the control mark 39 or 39' is sensed, the discrimination circuitry 40 provides an "end of page" signal on a line 80. If the mark 39 or 39' also is used as an answer control mark, appropriate "increment address" and "shift" signals also are supplied by the logic 66 on the lines 73 and 75.

When a test sheet 16 or 17 is scored by the apparatus 15, the "start of test" signal on the line 62 combined with the absence of a "master" signal on the line 64 causes the logic 66 to provide a "read" signal on the line 69 enabling readout of correct answers from the memory 38. As each answer control mark 37 or 37' is sensed, the "answer" signal on the line 72 causes the logic 66 to provide appropriate "increment address" and "shift" signals. Accordingly, test answers read from the sheet 16 or 17 will be provided via the data storage register 77 and the line 78 to an error detection unit 80. These test answers are compared by an answer comparator 81 with the correct answers supplied from the memory 38 via a line 82. If an error is detected, a signal is provided on a line 83 causing the error marker 45 to print an error mark 44 or 44'.

If no error is detected, a signal is provided via a line 84 to a circuit 85 which determines whether a valid question is present. This is accomplished by ascertaining from data on the line 82 whether the memory 38 contained an answer for the question being scored. If no answer has been stored, the question is considered invalid, and the score is not incremented. If the question is valid and there is no error, the circuit 85 provides an "increment score" signal via a line 86 to a scoring and marking section 87.

The signal on the line 86 increments a score counter 88 associated with the score printer 51 and a score counter 89 associated with the display 23. These counters 88, 89 tally the number of correct answers on the sheet 16 or 17 presently being scored.

When the end of page mark 39 or 39' is detected, the system control logic 66 provides a "print" signal on a line 91. This signal causes appropriate print logic 92 to transfer the test score from the counter 88 to the score printer 51 for printout onto the sheet 16. This transfer operation clears the score counter 88. The score counter 89 retains the test score until the next test sheet 16 is fed into the apparatus 15. When that occurs, the start of test signal on the line 62 causes the logic 66 to provide a "reset" signal on a line 93. This reset signal clears the score counter 89 and resets the address control 74 to ensure readout of the correct answer memory 38 beginning with the first question being scored.

Rescore operation is like that for normal scoring. However, when the rescore switch 55 is closed, the system control logic 66 provides a "rescore" signal via a line 94 to the error marker 45 and the print logic 92. This results in offsetting of the error marks and printed score.

The apparatus 15 (FIG. 1) also includes provision for computing and displaying the average score for a number of test sheets. Accordingly, the scoring and marking section 87 (FIG. 6) includes a sum (Σ) score accumulator 95 and a number of tests counter 96 which are cleared by a signal on a line 97 only when the apparatus 15 is set to the program mode. Thereafter, the accumulator 95 is incremented by the increment score signal on the line 86 so that the contents of the accumulator 95 represents the total number of correct answers for all the test sheets scored since entry of the master. The number of tests counter 96 is incremented by the signal on the line 80 each time an "end of page" signal occurs, so that the contents of the counter 96 represent the number of sheets scored since entry of the master.

To obtain the average score, a compute average switch 98 is depressed. This causes an average computer 99 to divide the sum score from the accumulator 95 by the number of tests indicated by the counter 96. The quotient, or average test score, is shown on the display 23 when the compute average switch 98 is depressed, instead of the current test score from the counter 89.

Figure 7:
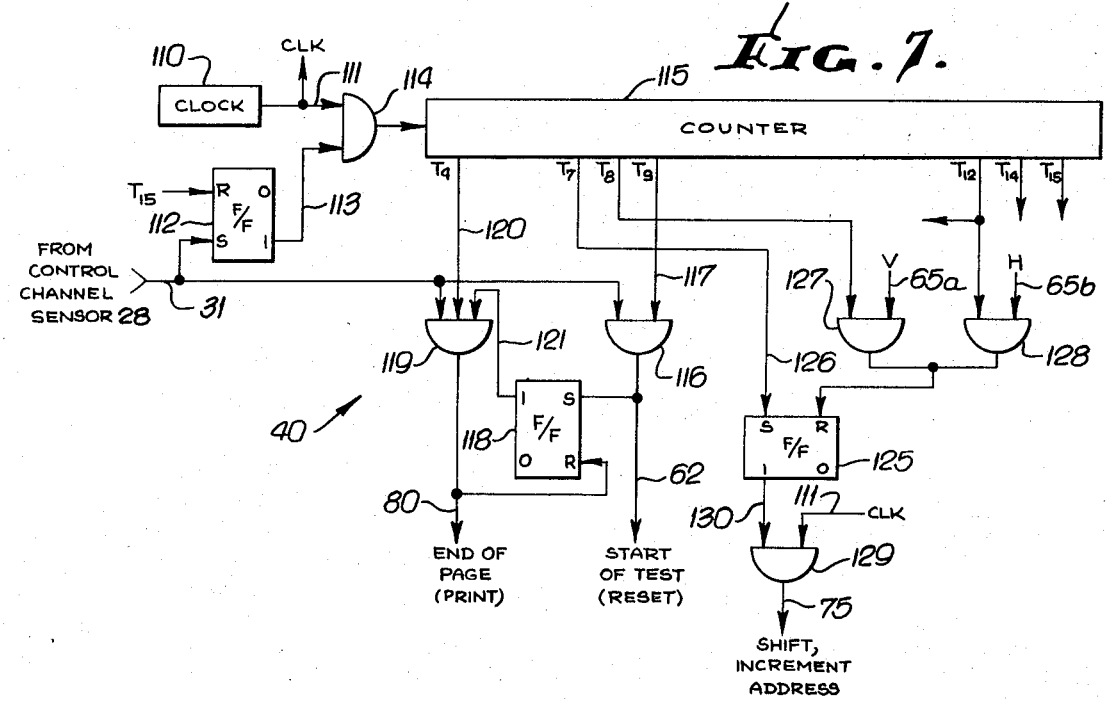
FIG. 7 is an electrical block diagram of the control mark discrimination circuitry and part of the system control logic of FIG. 6.

Simplified control mark discrimination circuitry 40 is shown in FIG. 7. A clock 110 provides timing (CLK) pulses on a line 111 at a rate sufficient to produce at least 15 such pulses between sensing of consecutive answer control marks 37. When the sensor 28 detects the leading edge of any control mark in the column 26 or 26', the signal on the line 31 sets (S) a flip-flop (F/F) 112 to the true or "1" state. The resultant output on a line 113 enables an AND gate 114 to supply the clock pulses to a counter 115. Accordingly, the counter 115 acts as a timer started upon detection of the leading edge of any control mark and providing timing outputs designated $T_1$ through $T_{15}$ as the respective first through fifteenth CLK pulses are provided via the gate 114. Occurrence of the $T_{15}$ signal resets the flip-flop 112.

The CLK pulse rate is appropriately selected with respect to the size of the control marks and the rate of transport of the test sheets past the read station 24 so that only for a start of test mark 35 or 35' will the control channel sensor 28 still provide an output when the timing output $T_9$ occurs. Thus the "start of test" signal on the line 62 simply may be provided by an AND gate 116 receiving the sensor 28 output on the line 31 and the $T_9$ timing output via a line 117. The signal on the line 62 may enable the reset signal on the line 93 (FIG. 6) and sets a flip-flop 118 used in conjunction with the end of page discrimination circuitry.

The length of each answer control mark 37 or 37' is selected to produce a sensor 28 output of duration less than four CLK pulses, and the end of page mark 39 or 39' is selected to produce a signal on the line 31 of duration greater than four clock pulses. Accordingly, the "end of page" signal on the line 80 may be provided by a three input AND gate 119 receiving the sensor 28 output via the line 31 and the $T_4$ timing signal via a line 120. The AND gate 119 is enabled by the set or "1" output of the flip-flop 118 provided via a line 121. The flip-flop 118 ensures that a signal does not occur on the line 80 during detection of a "start of test" mark 35 or 35' although such mark is greater than four CLK pulses in duration. The flip-flop 118 is reset by the trailing edge of the "end of page" signal.

Illustrative circuitry for producing the "shift" and "increment address" signals also is shown in FIG. 7. For tests in the horizontal (H) format, a number of "shift" signals equal to the number of answer receiving spaces 27 associated with each answer control mark 37 are produced when a control mark is detected. Thus for use with the test sheet 16, five "shift" signals are provided in unison with the $T_7$ through $T_{11}$ CLK intervals. For tests in the vertical (V) format, a single "shift" signal is provided at the $T_7$ clock time.

To this end, a flip-flop 125 is set by the $T_7$ output provided via a line 126 from the counter 115. The flip-flop 125 is reset by the $T_8$ timing signal supplied via an AND gate 127 enabled when the vertical (V) format is used. For tests in the horizontal (H) format, the $T_{12}$ timing signal is supplied via an AND gate 128 to reset the flip-flop 125. The shift pulses on the line 75 may be produced by an AND gate 129 enabled by the "1" output on the line 130 from the flip-flop 125 to pass the CLK pulses from the line 111. With this arrangement, detection of each control mark will cause one shift pulse to be provided by the AND gate 131 for the vertical format and five shift pulses to be provided for the horizontal format.

The output from the AND gate 129 also may correspond to the "increment address" signals on the line 73, with appropriate provision to inhibit such signals during detection of the start of test mark 35 or 34'. Alternatively, it may be preferred to have the shift pulses lag the increment address pulses. This may be accomplished by using the AND gate 129 output as the increment address signal. Delayed shift signals then may be supplied a separate AND gate (not shown) combining the signal on the line 130 with inverted ($\overline{CLK}$) clock pulses from the line 111.

Figure 8:
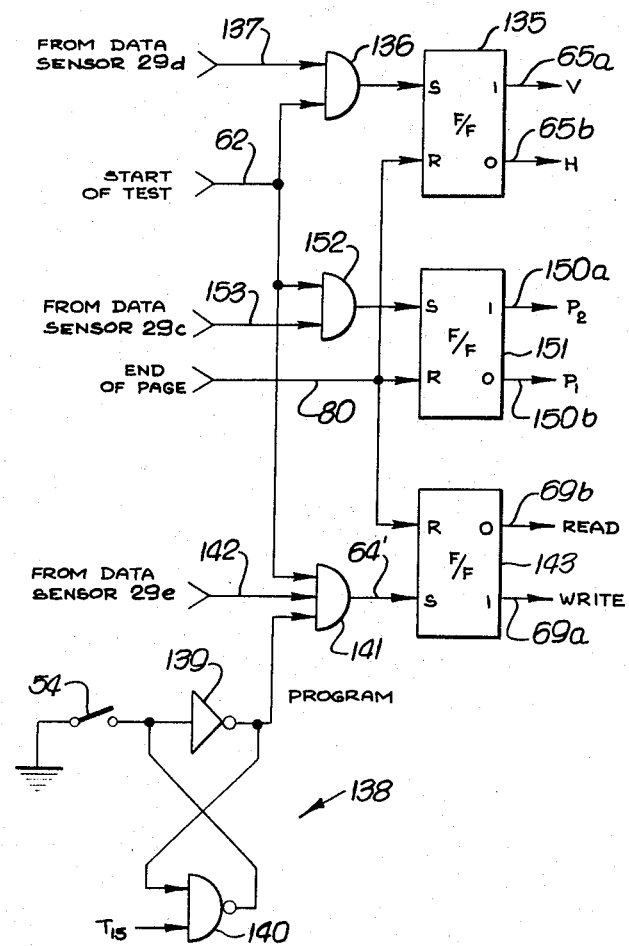
FIG. 8 is an electrical block diagram showing portions of the mode detection circuitry and system control logic of FIG. 6.

Illustrative mode detection circuitry 63 is shown in FIG. 8. A flip-flop 135 provides an output indicating whether the test being scored is in the vertical (V) or horizontal (H) format. Occurrence of the "start of test" signal on the line 62 enables an AND gate 136 which receives via a line 137 the output from the data channel sensor 29d. If a "vertical" mark 58 is present on the test or master sheet being read, the signal on the line 137 will be true and the flip-flop 135 will be set, providing a "V" output on a line 65a. This signal, which is present until the flip-flop 135 is reset upon occurrence of the "end of page" signal on the line 80, conditions the apparatus 15 to score a test in the vertical format. If the "vertical" mark 58 is not present, the flip-flop 135 will remain in the "0" state, providing an "H" output on a line 65b indicative of the horizontal format.

Programming or entry of correct answers to the memory 38 occurs only when the program switch 54 is closed and a master sheet is present. A bistable circuit 138 (FIG. 8) comprising an inverter 139 and a NAND gate 140 is set when the switch 54 momentarily is closed. When so set, the circuit 138 enables a three input AND gate 141 which also receives as inputs the "start of test" signal on the line 62 and the output from the data channel sensor 29e via a line 142. If the master mark 53 is present, all three inputs to the AND gate 141 will be true and a signal will be provided via a line 64' to set a flip-flop 143. As a result, a "write" signal is supplied via a line 69a to enable correct answer entry into the memory 38. The flip-flop 143 is reset by the "end of page" signal on the line 80.

If a test sheet is read, no signal occurs on the line 142 in unison with the "start of test" signal, since the test sheet has no master mark 53. As a result, the flip-flop 143 is not set, regardless of whether the program switch 54 has been closed, and a "read" output is provided on a line 69b to condition readout of correct answers from the memory 38.

The bistable circuit 138 automatically is reset, as by the timing pulse $T_{15}$. Thus if the master sheet is reread by the apparatus 15 without again depressing the program switch 54, no output will occur from the AND gate 141, and the flip-flop 143 will continue to provide a "read" output for verification of data entry; the answers will not be rewritten to the memory 38.

Figure 9:
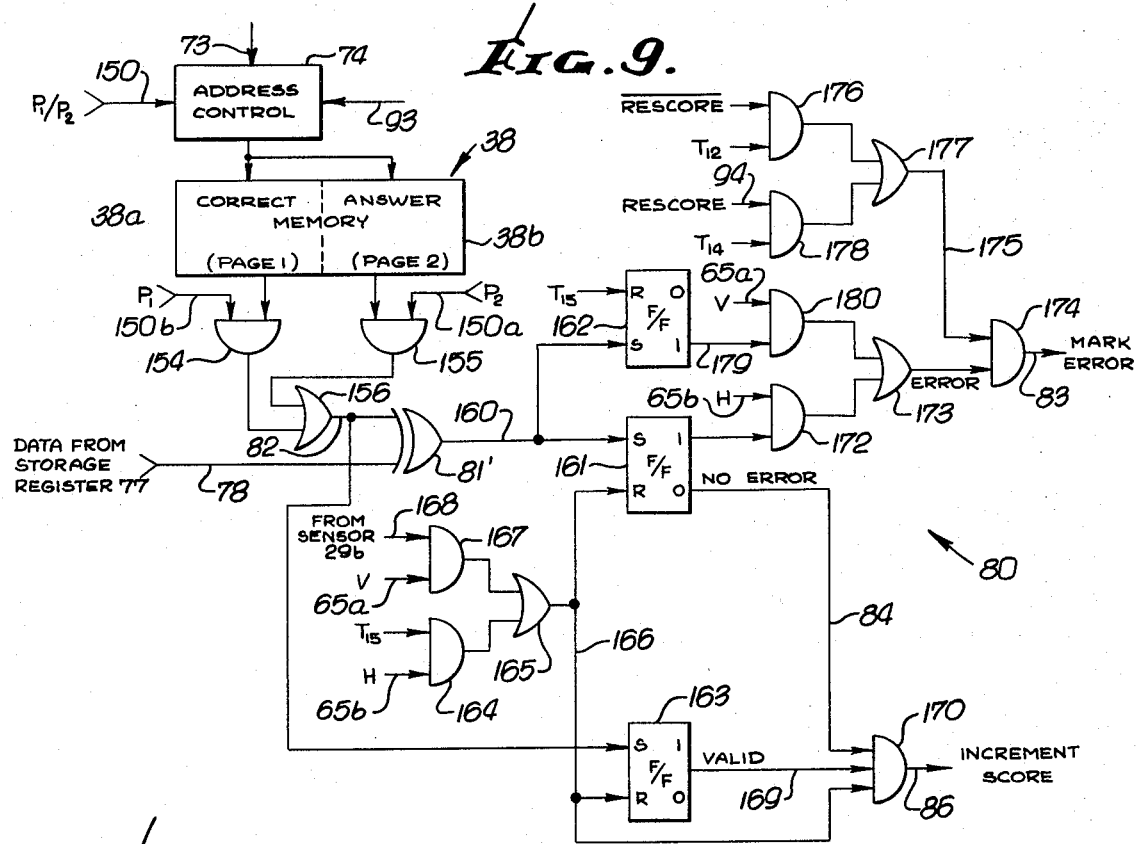
FIG. 9 is an electrical block diagram of the error detection circuitry of FIG. 6.

The memory 38 (FIG. 6) may have sufficient capacity to store the correct answers for two separate tests, or for a single test requiring two answer sheets. Thus in FIG. 9 the memory 38 includes two sections 38a, 38b each of which may have 250 binary storage locations, sufficient to store the correct answers for a one hundred question test having five possible answers for each question, with 50 questions on a first test sheet (page 1) and 50 questions on a second test sheet (page 2). The address control 74 may be conditioned to access the correct memory section 38a, 38b in response to a control signal on a line 150 indicative of whether the answer sheet first ($P_1$) or second ($P_2$) page is being read.

The $P_1/P_2$ control signal may be provided automatically by the mode detection circuitry 63 (FIGS. 6 and 8) in response to a page mark (not illustrated) located in row alignment with the start of page mark 35 or 35', and column aligned for detection by the data channel sensor 29c. The presence of such a mark might designate a second page, while absence of such mark may indicate page 1. Accordingly, a flip-flop 151 (FIG. 8) is set by the output of an AND gate 152 upon simultaneous occurrence of the start of test signal on the line 62 and an output on a line 153 from the data channel sensor 29c.

When set to the one state, the flip-flop 151 provides a "$P_2$" output on a line 150a to direct readout from the correct answer memory section 38b. In the absence of such a page mark, the flip-flop 151 will provide a "$P_1$" output via a line 150b to address the memory section 38a. The $P_1$ and $P_2$ signals also enable the respective AND gates 154, 155 (FIG. 9) to provide the appropriate correct answers from the memory 38 via an OR gate 156 and the line 82 to the answer comparator 81.

The answer comparator 81 may be implemented by an EXCLUSIVE OR gate 81' receiving correct answer data via the line 82 and answers from the test sheet being scored via the line 78. The signals on the lines 78 and 82 both are in serial, binary form. If the compared data are identical (both binary "1" or both "0"), no output is produced by the EXCLUSIVE OR gate 81'. If the data bits on the lines 78 and 82 are different (one a binary 0 and the other a 1) the EXCLUSIVE OR gate 81' will produce an output on a line 160 to set a pair of flip-flops 161, 162 used in conjunction with error marking and incrementing of the score.

A valid question indicating flip-flop 163 (FIG. 9) is set if at least one binary 1 has been stored for the corresponding question in the memory 38. The flip-flop 163 is reset at the end of each question. In the horizontal format the reset signal is provided by an AND gate 164 receiving as inputs the H signal on line 65b and the $T_{15}$ signal from the counter 115. The output of the AND gate 164 is supplied via an OR gate 165 to a line 166; the trailing edge of this signal resets the flip-flop 163. In the vertical data format, the reset signal is supplied by an AND gate 167 receiving as inputs the V signal on the line 65a and the output of the data channel sensor 29b on a line 168. As noted above, the sensor 29b output indicates detection of each "end of question" mark 56 on a test sheet 17.

For each question, the flip-flop 163 is set only if a binary 1 is read from the correct answer memory 38 via the line 82 prior to occurrence of the next end of question resetting signal on the line 166. When set, the flip-flop 163 provides a "valid" signal on line 169 to enable an AND gate 170.

The signal on the line 166 also resets an error indicating flip-flop 161. If for a particular question the test sheet data on the line 78 is identical to the correct answer data on the line 82, no signal will occur on the line 160 and the flip-flop 161 will remain in the 0 state. As a result, a "no error" signal will be provided via the line 84 to the AND gate 170. When enabled by the "valid" signal on the line 169, the "end of question" signal on the line 166 and the "no error" signal on the line 84, the AND gate 170 will provide the "increment score" signal on the line 86. If an error is detected, or if the question is invalid, no "increment score" signal will be produced.

For test sheets in the horizontal mode, a single error mark 44 or 44R (FIGS. 4B and 4C) is printed for each incorrectly answered question. To accomplish this, the 1 output of the flip-flop 161 is ANDed with the H signal on the line 65b by a gate 172 the output of which is supplied via an OR gate 173 to an AND gate 174 enabled by a timing signal on a line 175. The output from the AND gate 174 comprises the "mark error" signal on the line 83 to the marker 45.

When rescore is not selected, the timing signal on the line 175 is in unison with the $T_{12}$ output from the counter 115. The $T_{12}$ signal is ANDed in a gate 176 with the complement of the rescore signal from the line 94. The output of the AND gate 176 is supplied to the line 175 via an OR gate 177. During rescore, the timing signal on the line 175 is in unison with the $T_{14}$ signal provided via an AND gate 178 enabled by the rescore signal from the line 94. When rescore is not selected, each error mark 44 is in the position shown in FIG. 4C. When rescore is selected, the error mark is enabled at a later time ($T_{14}$ instead of $T_{12}$) causing the error marks 44R to be offset as shown in FIG. 4C.

In the vertical format an error mark is produced each time there is a mismatch between a data bit from the memory 38 and the corresponding test sheet data bit on the line 78. When such mismatch occurs the signal on the line 160 sets the flip-flop 162 (FIG. 9) to produce an output on a line 179 which is ANDed by a gate 180 with the V signal on the line 65a. The output of the AND gate 180 then is supplied via the OR gate 173 and the OR gate 174 to the mark error line 83. The flip-flop 161 is reset at the end of each timing cycle by the $T_{15}$ pulse.

Figure 10:
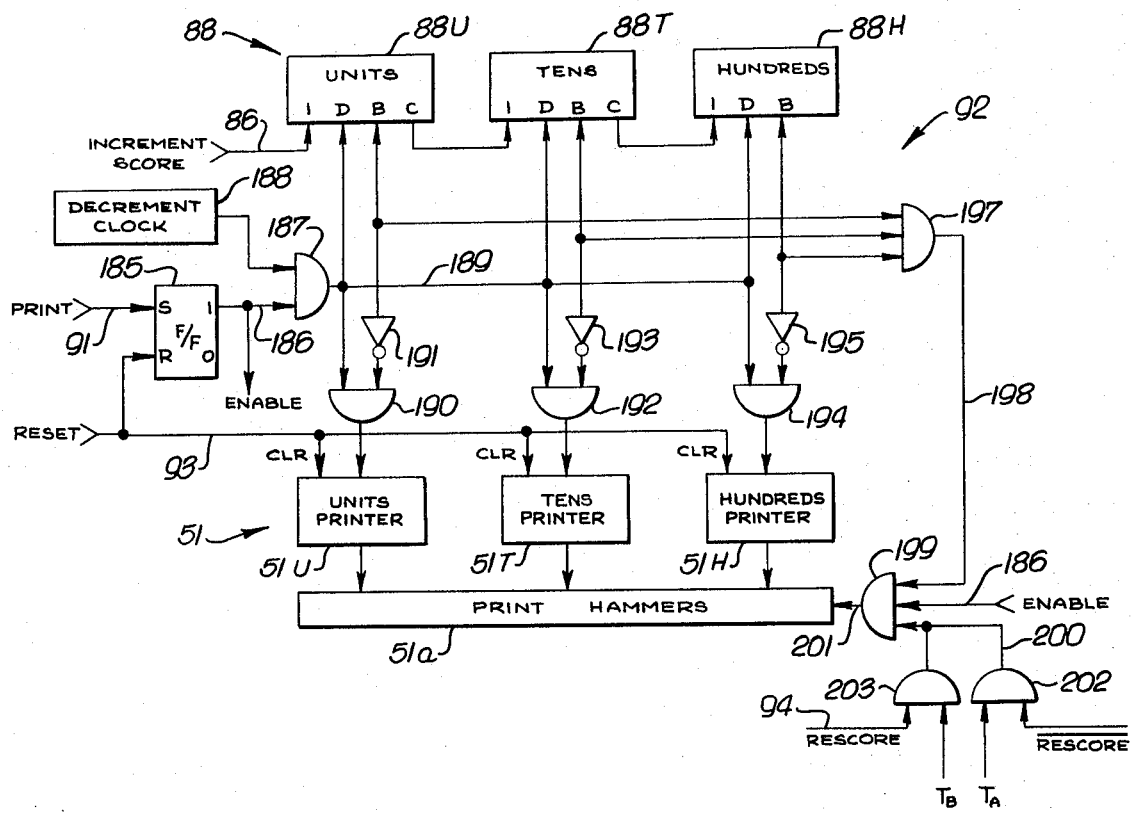
FIG. 10 is an electrical block diagram showing the score counter, score printer and print logic of FIG. 6.

A typical embodiment of the print logic 92 is shown in FIG. 10. There the score counter 88 is a decimal counter comprising a units section 88U, a tens section 88T and a hundreds section 88H. The increment score signal on the line 86 is supplied to the increment (I) input of the units section 88U. The carry (C) output of the section 88U is connected to the increment input of the tens counter 88T. The tens and hundreds section 88T, 88H are similarly connected. Thus when all questions on a test sheet have been scored, the counter 88 will contain a decimal representation of the number of correct answers.

The score printer 51 contains separate units, tens and hundreds print wheels 51U, 51T, 51H which are cleared by the reset signal on the line 93. When the print signal on the line 91 occurs, the units counter 88U rapidly is decremented to zero as the units print wheel 51U is advanced by a like number of counts. At the same time, the tens and hundreds counters 88T, 88H are decremented to zero as the print wheels 51T, 51H are incremented correspondingly. When all of the counter sections 88U, 88T, 88H have been decremented to zero, the print wheels 51U, 51T, 51H will be set to the test score. Appropriate print hammers 51a cooperate with the wheels 51U, 51T, 51H to print out the score.

To set the print wheels, the print signal on the line 91 sets a flip-flop 185 to supply via a line 186 a signal which enables an AND gate 187. The AND gate 187 then supplies pulses from a decrement clock 188 to a line 189 connected to the decrement (D) input of each counter section 88U, 88T, 88H. The clock pulses on the line 189 also are supplied via an AND 190 to the increment (I) input of the units print wheel 51U. The AND gate 190 is enabled by the complement of the borrow (B) output from the units counter 88U as provided by an inverter 191.

As each clock pulse decrements the counter section 88U it also increments the print wheel 51U. When the contents of the units counter 88U reach zero, the borrow output goes from zero to one thereby disabling the AND gate 190. As a result, the print wheel 51U will be set to exactly the same number as contained by the units section 88U when the decrementing was initiated. In effect, the contents of the units counter 88U will be transferred to the units print wheel 51U. Similarly, the AND gate 192 and inverter 193 cooperate to transfer the contents of the tens counter 88T to the tens print wheel 51T, and the AND gate 194 and inverter 195 transfer the contents of the hundreds counter 88H to the hundreds print wheel 51H.

The borrow (B) outputs of all three counter sections 88U, 88T, 88H are ANDed by a three input gate 197 to provide on a line 198 a signal which indicates that the entire score has been transferred to the print wheels of the printer 51. This signal is ANDed by a gate 199 with the enable signal on the line 186 and a timing signal on a line 200 to produce on a line 201 a signal causing operation of the print hammers 51a.

The timing signal on the line 200 may occur in unison with a first timing pulse $T_A$ gated by an AND gate 202 when rescore is not selected or in unison with a later timing pulse $T_B$ gated by another AND gate 203 when rescore is selected. Timing of the signals $T_A$, $T_B$ determine whether the score is printed in the test sheet location 52 or 52R as shown in FIG. 4C.

Intending to claim all novel, useful and unobvious features shown or described, we make the following claims:

1. Apparatus for scoring a test sheet having a control mark column beginning with (a) a start of test control mark, ending with (b) a page termination control mark and including therebetween a plurality of (c) answer control marks, said (a), (b) and (c) marks being of different size, and having a plurality of answer spaces for receiving indicia indicative of selected answers to multiple choice questions, said spaces being row aligned with said answer control marks, said apparatus comprising:

control means including a control channel sensor for detecting said control marks, transport means for moving a test sheet past said sensor, and discrimination circuitry for distinguishing between said (a), (b) and (c) control marks, data channel sensors row aligned with said control channel sensor for sensing indicia in said answer spaces concurrently with detection of a control mark by said control channel sensor, means responsive to detection of an answer control mark for comparing said concurrently sensed indicia with a stored correct answer to the corresponding question and for advancing a scoring counter in response to said comparison, and means responsive to detection of said page termination control mark for causing print-out of the score in said counter.

2. Test scoring apparatus according to claim 1 wherein said means responsive also causes said scoring counter to reset.

3. Test scoring apparatus according to claim 1 further comprising;

a memory storing said correct answers in binary storage locations each associated with a respective test sheet answer space, address control means for accessing from said memory the correct answers related to spaces from which said concurrently sensed indicia is obtained, and means for initializing said address control means upon detection of said start of test control mark.

4. Test scoring apparatus according to claim 1 wherein said page termination control mark also functions as an answer control mark, at least one answer space being row aligned with said page termination control mark.

5. Test scoring apparatus according to claim 4 and operative with either a test sheet or a master sheet configured like a test sheet but containing correct answers to be stored by said apparatus, and wherein each master sheet and test sheet also includes spaces row aligned with said start of test control mark and containing mode selection indicia sensed by said data channel sensors, said apparatus further comprising:

mode selection means enabled by detection of said start of test control mark for conditioning said apparatus to the mode specified by said mode selection indicia.

6. Test scoring apparatus according to claim 5 further comprising;

program latch means set manually cooperating with detection of said start of test control mark to cause entry into said memory of correct answers sensed by said data channel sensors from a master sheet configured like said test sheet.

7. Test scoring apparatus according to claim 6 wherein one of said mode selection indicia indicates that the sheet is a master sheet, said mode selection means conditioning entry of correct answers into said memory only upon sensing said one master sheet indicating indicia while said program latch means is set, sensing of said one indicia while said program latch means is not set conditioning said apparatus to verify that previously entered correct answers have been non-erroneously stored by said memory.

8. Test scoring apparatus according to claim 5 wherein a second of said mode selection indicia indicates whether the answer spaces associated with a single question are aligned horizontally with a single answer control mark or are individually aligned vertically with several successive answer control marks, said mode selection means conditioning addressing of said memory in accordance with whether horizontal or vertical format is specified.

9. Test scoring apparatus according to claim 5 wherein said memory is divided into two or more sections each associated with answer spaces on separate pages of a multi-page test, and wherein other mode selection indicia indicate whether the sheet being sensed is the first page or another page, said mode selection means cooperating with said address control means and said initializing means to enter into or access from said memory correct answers associated with the test section contained on said sheet being sensed.

10. Test scoring apparatus according to claim 9 wherein only the last page of a multi-page test has a page termination control mark, the multiple pages of a single test being scored in order by said apparatus, said scoring counter advancing throughout scoring of said test, score print-out of the total score for the entire test occurring upon sensing of said page termination control mark at the end of said last page.

11. Test scoring apparatus according to claim 9 wherein each page of a multi-page test has a page termination control mark, the test section score being printed-out at the end of the page containing that section, thereby enabling scoring of unsorted sheets of a multi-page test.

12. A scoring apparatus for use with a test sheet comprising:
a sheet of paper or like material having a first, generally straight longitudinal edge,
a control mark column parallel to said first edge containing a start of test mark of first length, a plurality of answer control marks each of a second length different from said first length, each answer control mark being aligned with a corresponding answer row perpendicular to said first edge, and a page termination mark having a third length different from both said first and second lengths, and
at least one answer column parallel to said control mark column but spaced therefrom, each answer row containing an answer receiving space aligned in each answer column,
said test scoring apparatus having (a) means for separately, concurrently sensing from said test sheet both an answer control mark and all answer receiving spaces in the answer row corresponding to that answer control mark, (b) means responsive to said start of test mark to initiate scoring of said test sheet, and (c) means responsive to said page termination mark to end scoring of said test sheet and to talley the number of correct answers marked in said test sheet answer receiving spaces and sensed by said (a) means.

13. Apparatus for scoring a test sheet of the type having plural indicia receiving spaces associated with answer options to a multiple choice question and having answer control marks row aligned with said spaces, comprising:
detector means for concurrently sensing an answer control mark and any answer spaces row aligned therewith and for entering binary data corresponding to indicia in said sensed spaces in parallel into a shift register,
drive means for transporting said test sheet past said detector means,
shift control means for shifting said binary data serially from said register and for concurrently accessing stored answer data from a correct answer memory,
answer comparator means for serially comparing said binary data and said stored answer data for each question and for providing an increment score signal indicative of a correct answer to that question when said binary data and answer data match, said serial comparison being completed before said detector means senses the answer spaces associated with the next question.

14. Test scoring apparatus according to claim 13 wherein said comparator means comprises an exclusive or circuit.

15. Test scoring apparatus according to claim 13 wherein the plural answer spaces associated with one question are row aligned with a single answer control mark, answer data for the corresponding question being stored in consecutive binary storage locations of said memory, said shift control means accessing answer data from said consecutive locations in unison with said serial shifting and at a rate sufficient for comparison of all answer options to said one question prior to detection of the next answer control mark.

16. Test scoring apparatus according to claim 13 wherein each of the plural answer spaces associated with one question is row aligned with a respective answer control mark, there being an end of question mark row aligned with the last answer space for said one question, answer data for the corresponding question being stored in consecutive binary storage locations of said memory, said shift control means accessing answer data from each of said consecutive locations as each answer control mark is sensed, said increment score signal being enabled upon detection of said end of question mark.

17. Test scoring apparatus according to claim 13 further comprising valid question means cooperating with said answer comparator means for determining from said answer data whether a correct answer option to an associated question has been stored in said memory and for inhibiting said increment score signal if no such option has been stored.

18. Test scoring apparatus according to claim 17 wherein said increment score signal advances both a scoring counter for said test sheet and a score accumulator for totaling the scores of a number of corrected test sheets.

19. Test scoring apparatus according to claim 18 further comprising a number of tests counter for tallying the number of corrected test sheets the scores of which have been totaled in said score accumulator.

20. Test scoring apparatus according to claim 19 further comprising means for computing the average score for said number of corrected test sheets by dividing the contents of said score accumulator by the contents of said number of tests counter.

21. Test scoring apparatus according to claim 20 together with means for entering into said correct answer memory answer data read from a master sheet configured like said test sheet, said means for entering also clearing the contents of said score accumulator and said number of tests counter when said answer data is entered.

22. Test scoring apparatus according to claim 17 wherein said increment score signal advances a score counter having an associated printer, and wherein said test sheet has a termination mark of size different from said answer control marks but column aligned therewith, detection of said termination mark causing print-out of the contents of said score counter.

23. Test scoring apparatus according to claim 22 wherein said score counter comprises a decimal or binary coded decimal counter and further comprising a decimal printer and print logic enabled by detection of said termination mark to increment said printer as said score counter is decremented to zero, separate decimal columns of said printer being incremented as the corresponding decimal portions of said score counter are decremented.

24. Test scoring apparatus according to claim 22 further comprising an error marker responsive to a mismatch between said binary data and said answer data for printing on said test sheet a mark adjacent an incorrect answer.

25. Test scoring apparatus according to claim 24 further comprising rescore means cooperating with said error marker and said printer for offsetting the mark printed by said error marker and the score print-out when a test sheet is rescored.

* * * * *